United States Patent Office 3,718,548
Patented Feb. 27, 1973

3,718,548
PROCESS FOR THE COLORING OF ANODIZED LAYERS ON ALUMINUM
Jean-Francois Paulet, Siblingen, and Fritz Endtinger, Neuhausen am Rheinfall, Switzerland, assignors to Swiss Aluminium Ltd., Chipps, Switzerland
No Drawing. Filed Apr. 13, 1971, Ser. No. 133,749
Claims priority, application Switzerland, Apr. 16, 1970, 5,662/70
Int. Cl. C23b 9/02
U.S. Cl. 204—35 N                 6 Claims

ABSTRACT OF THE DISCLOSURE

The invention relates to a process for coloring oxide layers on aluminum. This consists in using meltable organic coloring matters in undissolved state, which are brought into contact with the oxide layer and molten into the pores of the oxide layer by heating.

---

The coloring of anodized oxide layers on aluminum by treating the oxide layer with color-producing substances is already known. For specific purposes one can apply known coloring processes whereby for example, the oxide layers are painted with coloring matter. Coloring by means of baths which are made up by dissolving coloring matter in anhydrous substances such as paraffin, wax, or obtained by dissolving coloring matters such as salts of phthalocyaninesulfonic acid in water is also known. Another proposed method is to put mixtures containing organic noble metal compounds on to anodized layers and then to heat the object to be colored, whereby the noble metal compound is decomposed and the noble metal effecting a permanent color. The method of introducing mixtures of metal salts and organic solvents into anodic layers followed by thermic decomposition such as calcination, is also known to produce color in these layers.

It has also already been proposed for such purposes to use printing colors which contain as a basic liquid a water soluble organic hydroxy compound having a boiling point of above 100° C., a coloring substance dissolved therein and a filler made of a neutral solid pigment, whereby the basic liquid is removed by heating the object to be colored to temperatures of 180–230° C.

The process of coating certain objects with lacquer by electrophoresis in baths containing disparged lacquer particles followed by drying is also generally known. For example, black, fast colored coatings have been produced on aluminum oxide layers by inserting carbon into them by means of electrophoresis.

It appears however that only a very limited number of coloring materials and coloring methods can meet todays requirements in outside architecture, especially in regard to light and weather resistance. This especially applies to a great number of coloring materials which, because of their good solubility in certain kinds of solvents, are usually introduced into the anodic layers. On the other hand the so-called self-coloring anodising processes have the disadvantage that the achievable kinds and scales of colors are limited.

The present invention however permits the production of light-resistant, colored oxide layers by means of organic dyestuffs in an extensive range of colors. It relates to a method of coloring anodized oxide layers on aluminum and aluminum base alloys with organic dyestuffs. According to the invention, at least one undissolved meltable organic dyestuff is brought into contact with the oxide layer and is melted into said oxide layer by heating.

With the process according to the invention, the thermically melted dyestuff penetrates deep and evenly into the pores of the oxide layer. The following properties must be evident in the dyestuff to be applied: good resistance to light (fast to light), a melting point which lies at least above the temperatures of the objects to be colored when in use; preferably it should be thermically stable up to its melting point or, at least be only so slightly modified that the desired color will still be obtained.

The process of the invention has the advantage that those meltable organic dyestuffs which, due to their low solubility can not be dissolved to a sufficient concentration for preparing conventional coloring baths, but are applicable in suspended form or dry, can be successfully used for producing strong, even and light-resistant colors, since this group of dyestuffs contain a series of very light/weather-resistant pigments.

In the process of the invention one can, if desired, extend the heating to above the melting point of the dyestuff in order to achieve certain colors by means of an intentional part-decomposition of the dyestuff. The meltable dyestuff may be applied to the anodized layer by any known methods, for example: by scattering a coloring powder or by applying a suspension of low solubility meltable pigments with a brush or a spray gun, or also for example, by introducing the dyestuff particles into the pores of the anodized layer by electrophoresis or by vaporizing a volatile coloring matter on to the oxide layers to be colored.

In the method of the invention the heating of the dyestuff for the purpose of melting can be done by one of the known heating methods, for example: by means of warm air, hot gases, gas burners, or by radiation for example in a tunnel furnace with infrared heaters, or by inductive heating of the objects to be colored.

In order to facilitate or increase the penetration of the molten dyestuffs into the pores of the oxide layer it is also possible to apply low pressure or vacuum in order to effect an evacuation of air from the pores. This also may diminish the oxidizing effect of the air on the coloring matter.

The remaining surplus of coloring matter can be removed after cooling by known methods for example by dusting off with a soft cloth following which the colored anodized layer can be sealed as usual.

Multi-colored samples may also be produced by the invention process, if necessary with help of known covering techniques.

EXAMPLE 1

A sheet of aluminum alloy AlMg 1.5 was anodized in an electrolyte containing 20 wt. percent sulfuric acid (100%) at 25° C. for 60 minutes with a current density of 1 A./dm.$^2$.

After washing the sheet with water the dyestuff was put on and inserted into the anodised layer by means of electrophoresis in an aqueous suspension (2 wt. pts. color to 100 pts. water) of copperphthalocyanine.

The electrophoresis process was effected at room temperature for 5 minutes, applying a current of 200 volt. The sheet was dried for 10 minutes at room temperature and then retained for 10 minutes in a furnace at 350° C. Hereby, the dyestuff melted and distributed itself evenly into the pores of the oxide layer. After removing the surplus coloring matter with a soft cloth and sealing in boiling water, the sheet was of a light-resistant blue color.

EXAMPLE 2

A sheet of the same aluminum alloy AlMg 1.5 was anodized and treated by electrophoresis as described in Example 1, but in an aqueous suspension of the yellow dyestuff "Artilengelb Gl, Sandoz." After drying the sample was held at 200° C. for 3 minutes whereby the dyestuff melted evenly into the pores of the anodized layer.

Upon removal of the surplus dyestuff and sealing in boiling water, the sheet was of a light-resistant yellow color.

EXAMPLE 3

A sheet of the same aluminum alloy AlMg 1.5 was anodized according to Example 1. After drying, a powder-type dyestuff α-methylaminoanthraquinone was scattered on to the sheet which was then heated for 3 minutes at 165° C. until the dyestuff melted. A part of the dyestuff evaporated. Even so, after cleansing and sealing, the sheet was of a deep red color.

The same result was obtained when the dyestuff was evaporated and the vapor left to condense on the surface of a sheet, in either liquid or solid state. In the latter case heating to melting point led to an even distribution and coloring.

What is claimed is:

1. A process for coloring oxide layers produced by anodization on aluminum and aluminum base alloys with organic dyestuffs in which process at least one undissolved meltable organic dyestuff is brought into contact with said oxide layer and is melted into the pores of said oxide layer by heating.

2. A process according to claim 1 in which the dyestuff is applied on to the oxide layer.

3. A process according to claim 1 in which the dyestuff is deposited on and into the oxide layer by electrophoresis.

4. A process according to claim 1 in which melting of the dyestuff is effected by heating by means of warm air or other hot gases.

5. A process according to claim 1 in which melting of the dyestuff is effected by means of radiant heating.

6. A process according to claim 1 in which melting of the dyestuff is effected by means of inductive heating of the object to be colored.

References Cited

UNITED STATES PATENTS

| | | | |
|---|---|---|---|
| 1,923,539 | 8/1933 | Jenny et al. | 204—58 |
| 2,294,717 | 9/1942 | Carney | 204—35 N |
| 2,141,377 | 12/1938 | Chylinski | 204—58 |

JOHN H. MACK, Primary Examiner

R. L. ANDREWS, Assistant Examiner

U.S. Cl. X.R.

204—38 A, 58, 181